United States Patent
Joung

(10) Patent No.: US 11,025,370 B2
(45) Date of Patent: Jun. 1, 2021

(54) SPACE-TIME LINE CODING METHOD AND SYSTEM

(71) Applicant: CHUNG ANG UNIVERSITY INDUSTRY ACADEMIC COOPERATION FOUNDATION, Seoul (KR)

(72) Inventor: Jin Gon Joung, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/643,808

(22) PCT Filed: Jan. 18, 2018

(86) PCT No.: PCT/KR2018/000847
§ 371 (c)(1),
(2) Date: Mar. 2, 2020

(87) PCT Pub. No.: WO2019/045201
PCT Pub. Date: Mar. 7, 2019

(65) Prior Publication Data
US 2020/0235858 A1    Jul. 23, 2020

(30) Foreign Application Priority Data
Aug. 31, 2017    (KR) .......................... 10-2017-0111388

(51) Int. Cl.
*H04L 1/06*    (2006.01)
*H04B 7/08*    (2006.01)

(52) U.S. Cl.
CPC .......... *H04L 1/0693* (2013.01); *H04B 7/0885* (2013.01); *H04L 1/0643* (2013.01)

(58) Field of Classification Search
CPC ....... H04L 1/0643; H04L 1/06; H04L 1/0625; H04L 1/0668; H04L 1/0662; H04L 1/0693; H04B 7/0885
See application file for complete search history.

(56) References Cited

U.S. PATENT DOCUMENTS

| | | | |
|---|---|---|---|
| 2005/0063483 A1 | 3/2005 | Wang et al. | |
| 2008/0159426 A1* | 7/2008 | Jung | .................... H04B 7/0634 375/260 |
| 2009/0310687 A1 | 12/2009 | Wu et al. | |
| 2010/0119017 A1 | 5/2010 | Kim | |

FOREIGN PATENT DOCUMENTS

| | | |
|---|---|---|
| KR | 10-1500772 B1 | 3/2015 |
| WO | 2008/129427 A2 | 10/2008 |

\* cited by examiner

*Primary Examiner* — Rahel Guarino
(74) *Attorney, Agent, or Firm* — Novick, Kim & Lee, PLLC; Sang Ho Lee

(57) ABSTRACT

A space-time line coding system includes: in multiple antenna communication configured by at least one transmission antenna and at least two reception antennas, a transmitting end which encodes two information symbols using channel state information and sequentially transmits two encoded information symbols to a receiving end using the at least one transmission antenna; and a receiving end which receives two encoded information symbols using at least the two reception antennas and combines the received signals without channel state information.

12 Claims, 10 Drawing Sheets

(a) MRC (b) MRT (c) STBC (d) STLC

| $C_{(1,2)}$ | STLC encoding matrices | | Decoding function: $f(a,b) = a+b$ | |
|---|---|---|---|---|
| | | | for $\tilde{x}_1$ | for $\tilde{x}_2$ |
| | $C^a_{(1,2)} = \begin{bmatrix} h_1 & h_2 \\ h_2^* & -h_1^* \end{bmatrix}$ | | $f(r_{1,1}^*, r_{2,2})$ | $f(r_{2,1}^*, -r_{1,2})$ |
| | $C^b_{(1,2)} = \begin{bmatrix} h_1 & h_2 \\ -h_2^* & h_1^* \end{bmatrix}$ | | $f(r_{1,1}^*, -r_{2,2})$ | $f(r_{2,1}^*, r_{1,2})$ |
| | $C^c_{(1,2)} = \begin{bmatrix} h_1 & -h_2 \\ h_2^* & h_1^* \end{bmatrix}$ | | $f(r_{1,1}^*, r_{2,2})$ | $f(-r_{2,1}^*, r_{1,2})$ |
| | $C^d_{(1,2)} = \begin{bmatrix} -h_1 & h_2 \\ h_2^* & h_1^* \end{bmatrix}$ | | $f(-r_{1,1}^*, r_{2,2})$ | $f(r_{2,1}^*, r_{1,2})$ |
| Type | Encoding $s_1$ and $s_2$ | | Decoding for $\tilde{x}_1$ | Decoding for $\tilde{x}_2$ |
| 1 | $\begin{bmatrix} s_1 \\ s_2 \end{bmatrix} = C_{(1,2)} \begin{bmatrix} x_1 \\ x_2 \end{bmatrix}$ | | $f(\cdot,\cdot)$ | $f(\cdot,\cdot)$ |
| 2 | $\begin{bmatrix} s_1^* \\ s_2 \end{bmatrix} = C_{(1,2)} \begin{bmatrix} x_1 \\ x_2 \end{bmatrix}$ | | $f^*(\cdot,\cdot)$ | $f(\cdot,\cdot)$ |
| 3 | $\begin{bmatrix} s_1 \\ s_2^* \end{bmatrix} = C_{(1,2)} \begin{bmatrix} x_1 \\ x_2 \end{bmatrix}$ | | $f(\cdot,\cdot)$ | $f^*(\cdot,\cdot)$ |
| 4 | $\begin{bmatrix} s_1^* \\ s_2^* \end{bmatrix} = C_{(1,2)} \begin{bmatrix} x_1 \\ x_2 \end{bmatrix}$ | | $f^*(\cdot,\cdot)$ | $f^*(\cdot,\cdot)$ |
| 5 | $\begin{bmatrix} s_1 \\ s_2^* \end{bmatrix} = C_{(1,2)}^* \begin{bmatrix} x_1 \\ x_2 \end{bmatrix}$ | | $f^*(\cdot,\cdot)$ | $f^*(\cdot,\cdot)$ |
| 6 | $\begin{bmatrix} s_1 \\ s_2^* \end{bmatrix} = C_{(1,2)}^* \begin{bmatrix} x_1 \\ x_2^* \end{bmatrix}$ | | $f(\cdot,\cdot)$ | $f^*(\cdot,\cdot)$ |
| 7 | $\begin{bmatrix} s_1^* \\ s_2 \end{bmatrix} = C_{(1,2)}^* \begin{bmatrix} x_1 \\ x_2^* \end{bmatrix}$ | | $f^*(\cdot,\cdot)$ | $f(\cdot,\cdot)$ |
| 8 | $\begin{bmatrix} s_1 \\ s_2 \end{bmatrix} = C_{(1,2)}^* \begin{bmatrix} x_1 \\ x_2 \end{bmatrix}$ | | $f(\cdot,\cdot)$ | $f(\cdot,\cdot)$ |
| 9 | $\begin{bmatrix} s_1 \\ s_2 \end{bmatrix} = -C_{(1,2)} \begin{bmatrix} x_1 \\ x_2 \end{bmatrix}$ | | $-f(\cdot,\cdot)$ | $-f(\cdot,\cdot)$ |
| 10 | $\begin{bmatrix} s_1^* \\ s_2 \end{bmatrix} = -C_{(1,2)} \begin{bmatrix} x_1^* \\ x_2 \end{bmatrix}$ | | $-f^*(\cdot,\cdot)$ | $-f(\cdot,\cdot)$ |
| 11 | $\begin{bmatrix} s_1 \\ s_2^* \end{bmatrix} = -C_{(1,2)} \begin{bmatrix} x_1 \\ x_2^* \end{bmatrix}$ | | $-f(\cdot,\cdot)$ | $-f^*(\cdot,\cdot)$ |
| 12 | $\begin{bmatrix} s_1^* \\ s_2^* \end{bmatrix} = -C_{(1,2)} \begin{bmatrix} x_1 \\ x_2^* \end{bmatrix}$ | | $-f^*(\cdot,\cdot)$ | $-f^*(\cdot,\cdot)$ |
| 13 | $\begin{bmatrix} s_1 \\ s_2 \end{bmatrix} = -C_{(1,2)}^* \begin{bmatrix} x_1 \\ x_2 \end{bmatrix}$ | | $-f^*(\cdot,\cdot)$ | $-f(\cdot,\cdot)^*$ |
| 14 | $\begin{bmatrix} s_1 \\ s_2^* \end{bmatrix} = -C_{(1,2)}^* \begin{bmatrix} x_1^* \\ x_2 \end{bmatrix}$ | | $-f(\cdot,\cdot)$ | $-f^*(\cdot,\cdot)$ |
| 15 | $\begin{bmatrix} s_1 \\ s_2 \end{bmatrix} = -C_{(1,2)}^* \begin{bmatrix} x_1 \\ x_2^* \end{bmatrix}$ | | $-f^*(\cdot,\cdot)$ | $-f(\cdot,\cdot)$ |
| 16 | $\begin{bmatrix} s_1^* \\ s_2^* \end{bmatrix} = -C_{(1,2)}^* \begin{bmatrix} x_1 \\ x_2^* \end{bmatrix}$ | | $-f(\cdot,\cdot)$ | $-f(\cdot,\cdot)$ |

FIG. 3

SPACE-TIME LINE CODING METHOD AND SYSTEM

TECHNICAL FIELD

The present invention relates to a space-time line coding method and a system thereof. More specifically, the present invention relates to a space-time line coding method which performs space-time coding using channel information in a transmitting end to obtain a full space diversity in a receiving end without having channel information and a system which performs the method.

BACKGROUND ART

Recently, in a wireless communication environment, there is an increasing need for a communication service which requires a faster transmission speed and a high reliability. Accordingly, communication technologies which satisfy the demand for the communication service are being studied. One of the technologies is a multi-input multi-output (MIMO) technique.

The MIMO technique is a technique which enables a communication service having a fast transmission speed and a high reliability by adding a space resource to an existing frequency and a time resource. The MIMO technique is roughly divided into a spatial multiplexing technique and a space diversity technique.

According to the spatial multiplexing technique, a plurality of antennas is used to simultaneously transmit different data to transmit data at a higher speed without increasing a system bandwidth. In contrast, according to the space diversity technique, data including the same information is transmitted to different transmission antennas to achieve a high reliability.

Examples of the space-time code (STC) method of the related art which acquires a diversity M by the space diversity technique include MRC, MRT, STBC, and the like. However, according to the method of the related art, in a wireless transmission/reception system having M/2 antennas in a transmitting end and two antennas in a receiving end, only when the channel information is known in the transmitting end, there is no way to acquire the full space diversity gain M.

Therefore, a further study is needed for a communication method which acquires the full space diversity gain M when the channel information is known only in the transmitting end in the wireless transmission/reception system.

DISCLOSURE

Technical Problem

A technical object to be achieved by the present invention is to provide a space-time line coding method and system. Technical objects of the present invention are not limited to the aforementioned technical objects and other technical objects which are not mentioned will be apparently appreciated by those skilled in the art from the following description.

Technical Solution

In order to achieve the above-described technical objects, a space-time line coding method according to an embodiment of the present invention includes: in multiple antenna communication configured by at least one transmission antenna and two reception antennas, encoding two information symbols using channel state information, by a transmitting end; sequentially transmitting two encoded information symbols using one transmission antenna of the at least one transmission antenna of the at least two reception antenna to a receiving end, by the transmitting end; receiving the two encoded information symbols using the two reception antennas, by the receiving end; combining the received symbols without channel state information, by the receiving end.

Desirably, the encoding of two information symbols is performed by using orthogonal encoding matrix C.

Desirably, when the number of transmit antennas is at least two and the number of reception antennas is two, the encoding of two information symbols includes: encoding the information symbols by any one of the following Equations 12a to 12d:

$$S = C_{(1,2)} * X \qquad \text{[Equation 12a]}$$

$$S = C_{(1,2)}^{*} * X \qquad \text{[Equation 12b]}$$

$$S = -C_{(1,2)} * X \qquad \text{[Equation 12c]}$$

$$S = -C_{(1,2)}^{*} * X, \qquad \text{[Equation 12d]}$$

in which S is a 2*1 vector having the encoded information symbols as elements, C(1,2) is a 2*2 encoding matrix having the channel state information as elements, and X is a 2*1 matrix having the information symbol as elements.

Desirably, the encoding matrix $C_{(1,2)}$ is any one of $$C_{(1,2)}^{a} = \begin{bmatrix} h_1 & h_2 \\ h_2^* & -h_1^* \end{bmatrix} \text{ or } C_{(1,2)}^{b} = \begin{bmatrix} h_1 & h_2 \\ -h_2^* & h_1^* \end{bmatrix} \text{ or }$$

$$C_{(1,2)}^{c} = \begin{bmatrix} h_1 & -h_2 \\ h_2^* & h_1^* \end{bmatrix} \text{ or } C_{(1,2)}^{d} \begin{bmatrix} -h_1 & h_2 \\ h_2^* & h_1^* \end{bmatrix}$$

in which $h_1$ is a channel between the transmission antenna and a first reception antenna, and $h_2$ is a channel between the transmission antenna and a second reception antenna.

Desirably, a vector S having the encoded information symbols as elements is any one of $$\begin{bmatrix} s_1^* \\ s_2 \end{bmatrix} \text{ or } \begin{bmatrix} s_1 \\ s_2^* \end{bmatrix},$$

$s_1$ is an encoded information symbol to be transmitted at a first time, and $s_2$ is an encoded information symbol to be transmitted at a second time which is subsequent to the first time.

Desirably, the matrix X having the information symbol as elements is any one of $$\begin{bmatrix} x_1 \\ x_2 \end{bmatrix} \text{ or } \begin{bmatrix} x_1^* \\ x_2 \end{bmatrix} \text{ or } \begin{bmatrix} x_1 \\ x_2^* \end{bmatrix} \text{ or } \begin{bmatrix} x_1^* \\ x_2^* \end{bmatrix},$$

$x_1$ is a first information symbol and $x_2$ is a second information symbol.

Desirably, the combining of received signals includes: when the encoding matrix $C_{(1,2)}$ is $$C_{(1,2)}^a = \begin{bmatrix} h_1 & h_2 \\ h_2^* & -h_1^* \end{bmatrix},$$

combining a first information symbol as $f(r^*_{1,1}, r_{2,2})$ and combining a second information symbol as $f(r^*_{2,1}, -r_{1,2})$, in which a function f is f(a,b)=a+b and $r_{m,t}$ is a signal received by an m-th reception antenna at a time t.

Desirably, the combining of received signals includes: when the encoding matrix $C_{(1,2)}$ is $$C_{(1,2)}^b = \begin{bmatrix} h_1 & h_2 \\ -h_2^* & h_1^* \end{bmatrix},$$

combining a first information symbol as $f(r^*_{1,1}, -r_{2,2})$ and combining a second information symbol as $f(r^*_{2,1}, r_{1,2})$, in which a function f is f(a,b)=a+b and $r_{m,t}$ is a signal received by an m-th reception antenna at a time t.

Desirably, the combining of received signals includes: when the encoding matrix $C_{(1,2)}$ is $$C_{(1,2)}^c = \begin{bmatrix} h_1 & -h_2 \\ h_2^* & h_1^* \end{bmatrix},$$

combining a first information symbol as $f(r^*_{1,1}, r_{2,2})$ and combining a second information symbol as $f(-r^*_{2,1}, r_{1,2})$, in which a function f is f(a,b)=a+b and $r_{m,t}$ is a signal received by an m-th reception antenna at a time t.

Desirably, the combining of received signals includes: when the encoding matrix $C_{(1,2)}$ is $$C_{(1,2)}^d = \begin{bmatrix} -h_1 & h_2 \\ h_2^* & h_1^* \end{bmatrix},$$

combining a first information symbol as $f(-r^*_{1,1}, r_{2,2})$ and combining a second information symbol as $f(r^*_{2,1}, r_{1,2})$, in which a function f is f(a,b)=a+b and $r_{m,t}$ is a signal received by an m-th reception antenna at a time t.

Desirably, the method may further include: performing the encoding and the transmitting for each of transmitting antennas in parallel when at least two transmitting antennas are provided.

In order to achieve the above-described technical objects, a space-time line coding system according to another embodiment of the present invention includes: in multiple antenna communication configured by at least one transmission antenna and at least two reception antennas, a transmitting end which encodes two information symbols using channel state information and sequentially transmits two encoded information symbols to a receiving end using the at least one transmission antenna; and a receiving end which receives two encoded information symbols using the at least two reception antennas and combines the received signals without channel state information.

Advantageous Effects

Effects according to the present invention are as follows:
Even through a receiving end does not have channel information and only a transmitting end knows the channel information, the full space diversity may be acquired. By doing this, the reliability of wireless communication may be increased and stable communication may be performed. Further, a symmetrical structure to the STBC of the related art is provided so that the present invention is applicable to an uplink and a downlink together with the STBC.

The effects of the present invention are not limited to the technical effects mentioned above, and other effects which are not mentioned can be clearly understood by those skilled in the art from the following description.

DESCRIPTION OF DRAWINGS

FIGS. 1A to 3 are views for comparing a space-time line coding method according to an embodiment of the present invention with the method of the related art.

BEST MODE

Figure 1A:
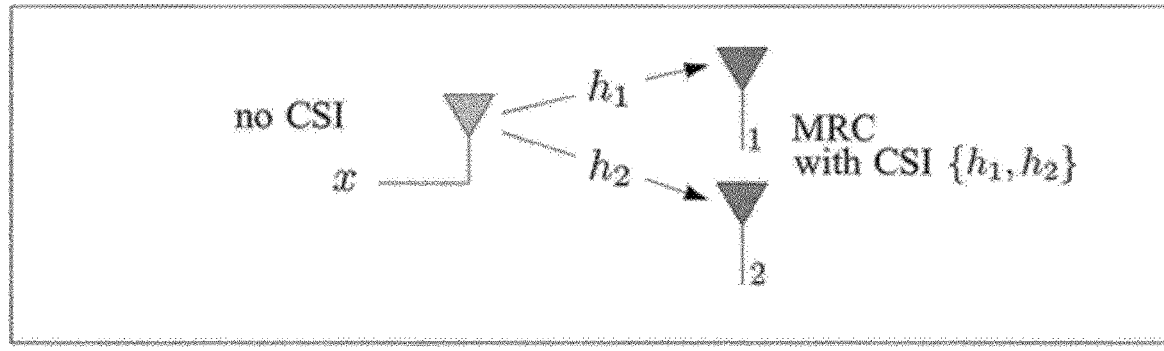

Those skilled in the art may make various modifications to the present invention and the present invention may have various embodiments thereof, and thus specific embodiments will be illustrated in the drawings and described in detail in detailed description. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, exemplary embodiments according to the present invention will be described in detail with reference to accompanying drawings.

FIGS. 1A to 3 are views for comparing a space-time line coding method according to an embodiment of the present invention with the method of the related art.

Prior to comparing the space-time line coding method according to one embodiment of the present invention with the related art, commonly applied matters will be assumed as follows: First, when a channel is denoted by $h_m$, a sum of all channel gains is defined by the following Equation 1.

$$\gamma_M = \sum_{m=1}^{M} |h_m|^2, \quad \text{[Equation 1]}$$

Here, M means a number of channels. Hereinafter, for better understanding of the present invention, under the assumption that the number of channels is 2, the description will be continued. That is, description will be made with respect to a two-channel diversity system such as 1×2 MRC, 2×1 MRT, and 2×1 STBC, which are illustrated in FIGS. 1A, 1B, and 1C, respectively.

Figure 1B:
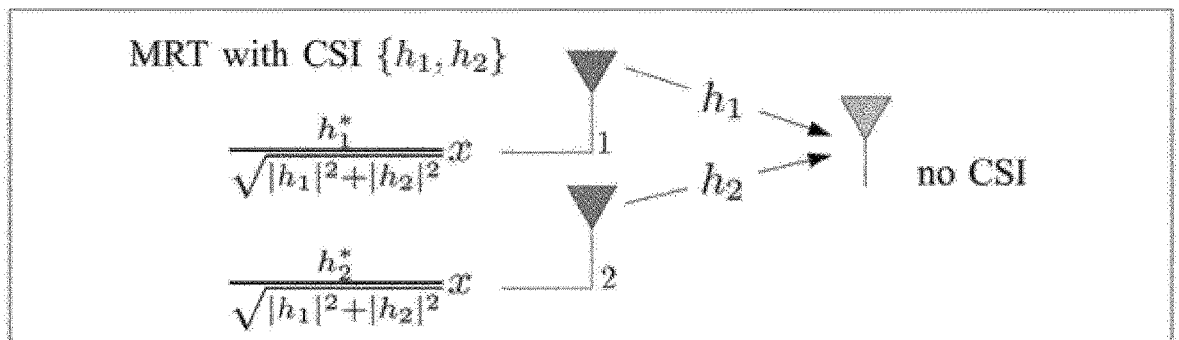
Figure 1C:
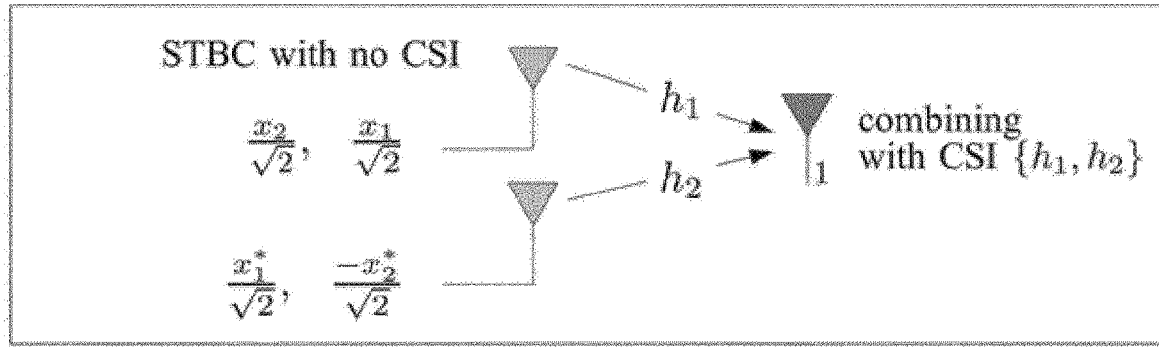

FIG. 1A is a view for explaining a maximum ratio combining (MRC) method of the related art. Referring to FIG. 1A, it is understood that one antenna is provided in a transmitting end and two antennas are provided in a receiving end. In this case, it is understood that the transmitting end does not have channel state information (CSI), but the receiving end has channel state information (CSI).

Here, x is assumed as an information symbol which follows a complex normal distribution of $E[|x|^2]=E_S$, that is, $CN(0, E_S)$. Further, two Rayleigh fading channels from a transmission antenna to a m-th reception antennas are defined as $h_m$, that is, $h_1 \sim CN(0,1)$ and $h_2 \sim CN(0.1)$.

The transmitting end does not have channel state information so that x is transmitted to the receiving end without precoding. In this case, a reception signal $r_m$ in the m-th reception antennas may be represented by the following Equation 2.

$$r_m = h_m x + z_m, \ m \in \{1,2\}, \quad \text{[Equation 2]}$$

Here, a total transmission power is limited by a symbol power $E_S$ and an additive white Gaussian noise in the m-th reception antenna having a zero mean and an $N_0$ variance, that is, $z_m \sim CN(0, N_0)$, is assumed as $z_m$.

By doing this, an optimal reception combination weight in a post-processing process which maximizes a signal to noise ratio (SNR) of the received signal is $h^*_m/\sqrt{N_o}$. An MRC output signal at the m-th reception antenna is derived from Equation 2 as follows using the weight.

$$\frac{h_1^*}{\sqrt{N_o}}r_1 + \frac{h_2^*}{\sqrt{N_o}}r_2 = \frac{\gamma_2}{\sqrt{N_o}}x + \frac{1}{\sqrt{N_o}}(h_1^* z_1 + h_2^* z_2) \quad \text{[Equation 3]}$$

When a combination signal derived by Equation 3 is input to a maximum likelihood (ML) detector which acquires a full diversity gain, a maximized received signal to noise ratio is represented by the following Equation 4.

$$SNR_{MRC}(\gamma_2) = \frac{\gamma_2 E_S}{N_o}. \quad \text{[Equation 4]}$$

As seen from Equation 4, a diversity gain acquired by the MRC technique is 2. In this case, a transmission speed is 1.

FIG. 1B is a view for explaining a maximum ratio transmission (MRT) method of the related art. Referring to FIG. 1B, it is understood that two antennas are provided in a transmitting end and one antenna is provided in a receiving end. In this case, it is understood that the transmitting end has channel state information (CSI), but the receiving end does not have channel state information (CSI).

Differently from the MRC method of FIG. 1A, according to the MRT method, the transmitting end knows channel state information so that the transmitting end applies a weight during a precoding process to obtain a weight symbol as follows. In this case, the weight symbol is a weight symbol for the m-th transmission antenna which maximizes a received signal to noise ratio.

$$s_m = \frac{h_m^*}{\sqrt{\gamma_2}}x, \ m \in \{1, 2\}, \quad \text{[Equation 5]}$$

Here, $h_m$ indicates a channel gain from a m-th transmission antenna to a reception antenna. In Equation 5, a denominator follows a transmission power constraint. That is, a total transmission power is limited by a symbol power $E_S$ as an MRC system. The weight symbol is simultaneously transmitted to the receiving end through two antennas and the reception signal is derived as represented by the following Equation 6.

$$r = h_1 s_1 + h_2 s_2 + z = \sqrt{\gamma_2} x + z, \quad \text{[Equation 6]}$$

Here, z is an additive white Gaussian noise and is represented by $z \sim CN(0, N_0)$. Similarly to the MRC method of FIG. 1A, the received signal to noise ratio of the MRT method is derived from Equation 6, as represented in the following Equation 7.

$$SNR_{MRT}(\gamma_2) = \frac{\gamma_2 E_S}{N_o}, \quad \text{[Equation 7]}$$

As in a case of Equation 4, a full diversity gain of Equation 7 is 2. This is the same as the full diversity gain of the MRC system. As described above, when a number of antennas of the receiving end which knows the channel state information is plural or a number of antennas of the transmitting end which knows the channel state information is plural, the MRC method or the MRT method is applied to obtain the full diversity gain.

FIG. 1C is a view for explaining a space-time block code (STBC) method of the related art. Referring to FIG. 1C, it is understood that two antennas are provided in a transmitting end and one antenna is provided in a receiving end. In this case, it is understood that the transmitting end does not have channel state information (CSI), but the receiving end has channel state information (CSI).

When the transmitting end having a plurality of antennas does not have channel state information, but the receiving end has the channel state information, the receiving end obtains a full diversity gain using the STBC of the following Table 1.

TABLE 1

|  | Tx antenna 1 | Tx antenna 2 |
| --- | --- | --- |
| Tx time t = 1 | $x_1$ | $x_2$ |
| Tx time t = 1 | $-x_2^*$ | $x_1^*$ |

Two consecutive STBC symbols are transmitted through two transmission antennas at two consecutive symbol times (t=1 and t=2). When a reception signal at a time t is represented as $r_t$, these are defined as represented in Equation 8.

$$r_1 = h_1 \frac{x_1}{\sqrt{2}} + h_2 \frac{x_2}{\sqrt{2}} + z_1,$$
$$r_2 = -h_1 \frac{x_2^*}{\sqrt{2}} + h_2 \frac{x_1^*}{\sqrt{2}} + z_2,$$
[Equation 8]

Here, $1/\sqrt{2}$ is used for a power constraint condition $E_s$ at each transmission time. Further, an additive white Gaussian noise at each transmission time $r_t$ is defined as $z_t$. A receiver realigns $r_1$ and $r_2$ using the following Equation 9 and forms a vector $r=[r_1 \; r_2^*]^T$.

$$r = \frac{1}{\sqrt{2}} \begin{bmatrix} h_1 & h_2 \\ h_2^* & -h_1^* \end{bmatrix} \begin{bmatrix} x_1 \\ x_2 \end{bmatrix} + \begin{bmatrix} z_1 \\ z_2^* \end{bmatrix} \triangleq \frac{1}{\sqrt{2}} H_{(1,2)} \begin{bmatrix} x_1 \\ x_2 \end{bmatrix} + z,$$
[Equation 9]

Here, $H_{(1,2)}$ is an effective channel matrix of the STBC and a subscript (1,2) means $h_1$ and $h_2$. $H_{(1,2)}$ satisfies an orthogonal property, that is, $$H_{(1,2)}^H H_{(1,2)} = \begin{bmatrix} 1 & 0 \\ 0 & 1 \end{bmatrix}$$

for optimal decoding or combining. By doing this, the receiving end multiplies $H^H_{(1,2)}$ by r. A signal decoded by the above-described process is represented by the following Equation 10.

$$H_{(1,2)}^H r = \frac{\gamma_2}{\sqrt{2}} \begin{bmatrix} 1 & 0 \\ 0 & 1 \end{bmatrix} \begin{bmatrix} x_1 \\ x_2 \end{bmatrix} + z',$$
[Equation 10]

Here, $z'=H_{(1,2)}^H z$ is a complex Gaussian noise vector having a zero mean and a covariance matrix $$E[z'(z')^*] = \gamma_2 N_o \begin{bmatrix} 1 & 0 \\ 0 & 1 \end{bmatrix}.$$

By doing this, $x_1$ and $x_2$ are individually estimated by an ML detector from Equation 10 and the received signal to noise ratio may be defined by the following Equation 11.

$$SNR_{STBC}(\gamma_2) = \frac{\gamma_2 E_S}{2N_o}.$$
[Equation 11]

Similarly, STBC may acquire a full diversity gain of 2 from Equation 11. $x_m$ is transmitted using a half a total symbol energy $E_S$ so that there is no array processing gain. That is, an array gain is 1. Generally, M/2 array processing gain is achieved by 2×M/2 STBC method.

As described above, a space-time coding method of the related art for acquiring a full space diversity M has been described, which may be summarized as represented in the following Table 2.

TABLE 2

| Number of antennas and whether to have CSI | CSI only in receiving end | CSI only in receiving end |
| --- | --- | --- |
| One in transmitting end and two in receiving end | MRC | ?? |
| Two in transmitting end and one in receiving end | STBC | MRT |

As seen from Table 2, in a situation when the space-time coding method of the related art forms a correspondence and one antenna is provided in the transmitting end and two antennas are provided in the receiving end, there is no space-time coding method which is applicable to a case in which only the transmitting end knows channel state information. That is, there is no way to acquire a full space diversity gain M in a wireless system which is configured by M/2 transmission antennas and two reception antennas.

Therefore, a space-time coding method which is applicable in the above-described case will be proposed. When a method proposed by the present invention is used, the same channel gain as the STBC of the related art may be acquired. Further, the space-time coding is performed using channel information in the transmitting end so that the receiving end may perform the decoding without having channel information to acquire a full space diversity.

Figure 1D:
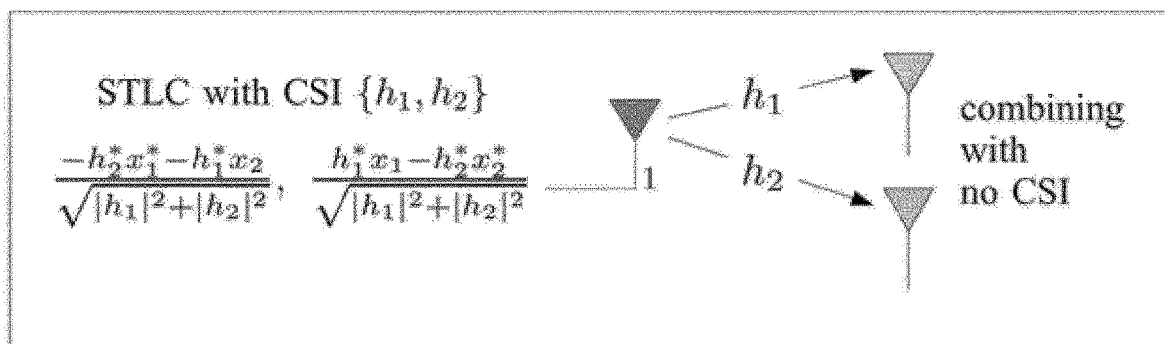

FIG. 1D is a view for explaining a space-time line code method according to an embodiment of the present invention. Referring to FIG. 1D, it is understood that one antenna is provided in a transmitting end and two antennas are provided in a receiving end. In this case, it is understood that the transmitting end has channel state information (CSI), but the receiving end does not have channel state information (CSI). In FIG. 1D, channel gains $h_1$ and $h_2$ indicate independent channel gains from the transmission antenna to a first reception antenna and a second reception antenna, respectively.

1) Encoding and Transmitting Order

An STLC symbol transmitted at a time t is assumed as $s_t$. Therefore, two information symbols $x_1$ and $x_2$ are encoded to two STLC symbols $s_1$ and $s_2$ by the following Equation 12.

$$\begin{bmatrix} s_1^* \\ s_2 \end{bmatrix} = C_{(1,2)} \begin{bmatrix} x_1^* \\ x_2 \end{bmatrix} = \begin{bmatrix} h_1 & h_2 \\ h_2^* & -h_1^* \end{bmatrix} \begin{bmatrix} x_1^* \\ x_2 \end{bmatrix},$$
[Equation 12]

Here, $C_{(1,2)}$ is an STLC encoding matrix having channels $h_1$ and $h_2$. In this example, the STLC encoding matrix $C_{(1,2)}$ is designed to be the same as the STBC effective channel matrix $H_{(1,2)}$ of Equation 9. Two STLC symbols $s_1$ and $s_2$ are consecutively transmitted for a first symbol period and a second symbol period and are represented in accordance with the following Table 3 from Equation 12 as represented in Equation 13.

TABLE 3

|  | Tx time t = 1 | Tx time t = 2 |
|---|---|---|
| Tx antenna 1 | $s_1 = h_1 x_1 + h_2 x_2$ | $s2 = h_2 x_1 - h_1 x_2$ |

$$s_1 = h^*_1 x_1 + h^*_2 x^*_2,$$

$$s_2 = h^*_2 x^*_1 - h^*_1 x_2. \quad \text{[Equation 13]}$$

In order to satisfy a transmission power constraint condition $E_S$, the transmitting end normalizes $s_1$ and $s_2$ with $\eta$ to consecutively transmit $s_1$ and $s_2$. A normalization coefficient $\eta$ may be easily obtained as $\eta = 1/\sqrt{\gamma_2}$ to satisfy $E[|\eta s_t|^2] = E_S$. When a reception signal in the m-th reception antenna at the time t is represented as $r_{m,t}$, four reception symbols may be represented by Equation 14 in accordance with Table 4.

TABLE 4

|  | Rx time t = 1 | Rx time t = 2 |
|---|---|---|
| Rx antenna 1 | $r_{1,1}$ | $r_{1,2}$ |
| Rx antenna 2 | $r_{2,1}$ | $r_{2,2}$ |

$$\begin{bmatrix} r_{1,1} & r_{1,2} \\ r_{2,1} & r_{2,2} \end{bmatrix} = \begin{bmatrix} h_1 \\ h_2 \end{bmatrix} \underbrace{\frac{1}{\sqrt{\gamma_2}} [s_1 \ s_2]}_{STLC} + \begin{bmatrix} z_{1,1} & z_{1,2} \\ z_{2,1} & z_{2,2} \end{bmatrix}, \quad \text{[Equation 14]}$$

Here, $z_{m,t}$ is an additive white Gaussian noise (AWGN) at $r_{m,t}$. When Equation 13 is substituted into $s_t$ of Equation 14, the reception signal $r_{m,t}$ may be rewritten by Equation 15.

$$r_{1,1} = \frac{1}{\sqrt{\gamma_2}} h_1 (h_1^* x_1 + h_2^* x_2^*) + z_{1,1}, \quad \text{[Equation 15]}$$

$$r_{1,2} = \frac{1}{\sqrt{\gamma_2}} h_1 (h_2^* x_1^* - h_1^* x_2) + z_{1,2},$$

$$r_{2,1} = \frac{1}{\sqrt{\gamma_2}} h_2 (h_1^* x_1 + h_2^* x_2^*) + z_{2,1},$$

$$r_{2,2} = \frac{1}{\sqrt{\gamma_2}} h_2 (h_2^* x_1^* - h_1^* x_2) + z_{2,2}.$$

In Equation 15, four reception symbols are decoded to be STLC symbols to acquire a full space diversity.

2) Decoding Method

Figure 2:
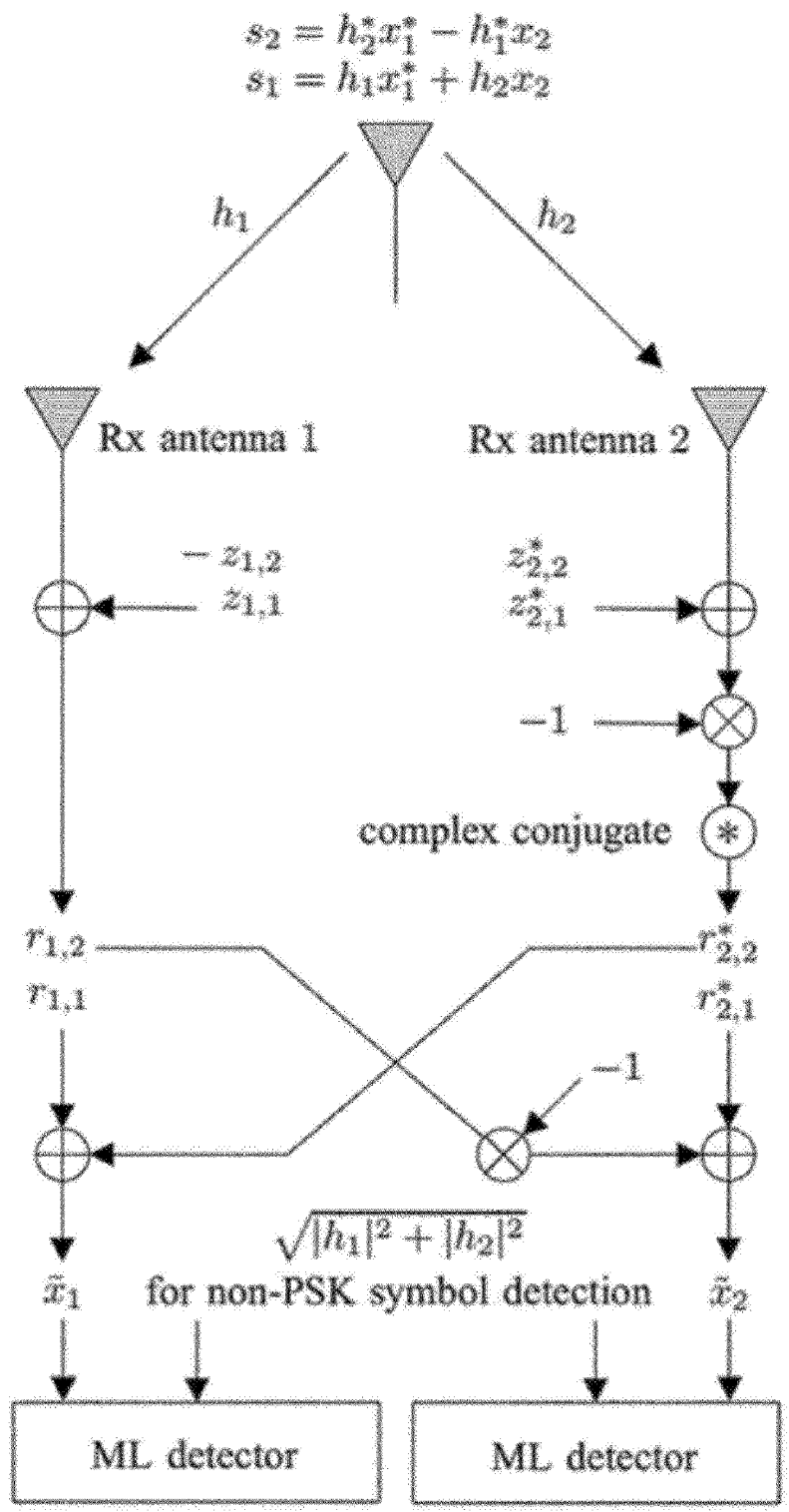

An STLC decoder is as illustrated in FIG. 2. In Equation 15, when $\{r_{m,t}\}$ is directly combined, the receiving end may decode the STLC symbol as represented in the following Equation 16.

$$r_{1,1} + r^*_{2,2} = \sqrt{\gamma_2} x_1 + z_{1,1} + z^*_{2,2}$$

$$r^*_{2,1} - r_{1,2} = \sqrt{\gamma_2} x_2 + z^*_{2,1} - z_{1,2}. \quad \text{[Equation 16]}$$

In Equation 16, a formula above is a function of $x_1$ and a formula below is a function of $x_2$. Therefore, $x_1$ and $x_2$ may be detected by two separated ML detectors like the STBC detector. In this case, in order to detect a subsequent ML, an effective channel gain $\sqrt{\gamma_2}$ is needed. However, unlike MRC of Equation 3, a STLC receiver does not need full channel state information to combine the signal received in Equation 16. Even CSI $\sqrt{\gamma_2}$ is not necessary to detect a phase shift keying (PSK) symbol.

3) Reception SNR of STLC

Since a sum of two dependent additive white Gaussian noises (dependent AWGN) is an additive white Gaussian noise (AWGN), $(z^*_{1,1} + z_{2,2})$ and $(-z_{2,1} + z^*_{1,2})$ of Equation 16 is an additive white Gaussian noise (AWGN) having a zero mean and $2N_0$ variance, that is, $(z^*_{1,1} + z_{2,2}) \sim CN(0, 2N_0)$ and $(-z_{2,1} + z^*_{1,2}) \sim CN(0, 2N_0)$.

Therefore, a resulting instantaneous signal to noise ratio after blind combining from Equation 16 may be defined by the following Equation 17.

$$SNR_{STLC}(\gamma_2) = \frac{\gamma_2 E_S}{2N_o}, \quad \text{[Equation 17]}$$

This corresponds to a signal to noise ratio of the STBC of Equation 11. From Equation 17, it is confirmed that the STLC achieves the same performance as the STBC in the view of a diversity gain and an array processing gain. As described in Equation 16, a factor of 2 is derived from the fact that two additive white Gaussian noises (AWGN) are directly combined in the receiving end.

4) Encoding and Combining Structure

Encoding and decoding structures of Equations 12 and 16 are not unique. Therefore, all possible STLC encoding and decoding structures are illustrated in FIG. 3. In the examples of Equations 12 and 16, an STLC matrix $C_{(1,2)}{}^a$ and type-2 STLC encoding and decoding structure may be used.

Here, $f(\bullet, \bullet)$ is a decoding function defined as $f(a,b) = a+b$. All STLC encoding matrices of FIG. 3 satisfy an orthogonal property, that is, $$C^H C = \gamma_2 \begin{bmatrix} 1 & 0 \\ 0 & 1 \end{bmatrix}$$

and a rank thereof is 2. That is, a maximum diversity order 2 is provided.

Apparently, the encoding method is determined by the decoding method. All encoding-decoding pairs provide the same performance, that is, a transmission speed gain of 1 and a full diversity gain of 2. However, the implementing requirements may not be the same.

For example, the type-2 STLC method requires a conjugate operation for only one radio frequency (RF) chain, for example, a second $R_x$ antenna of FIG. 2, but the type-1 STLC method requires a conjugate operation for both RF chains. By doing this, a design policy of the STLC structure may be provided in accordance with the performance of the receiver.

Until now, a process of applying the STLC method proposed by the present invention in an environment in which one transmission antenna and two reception antennas are provided has been described. It is confirmed that since the transmitting end knows channel state information, the encoding is performed using the channel state information and even though the receiving end does not have the channel state information, the decoding is performed.

Now, the above-described case is expanded to apply the STLC method to a general case with M/2 antennas in the transmitting end and M antennas in the receiving end.

Figure 4:
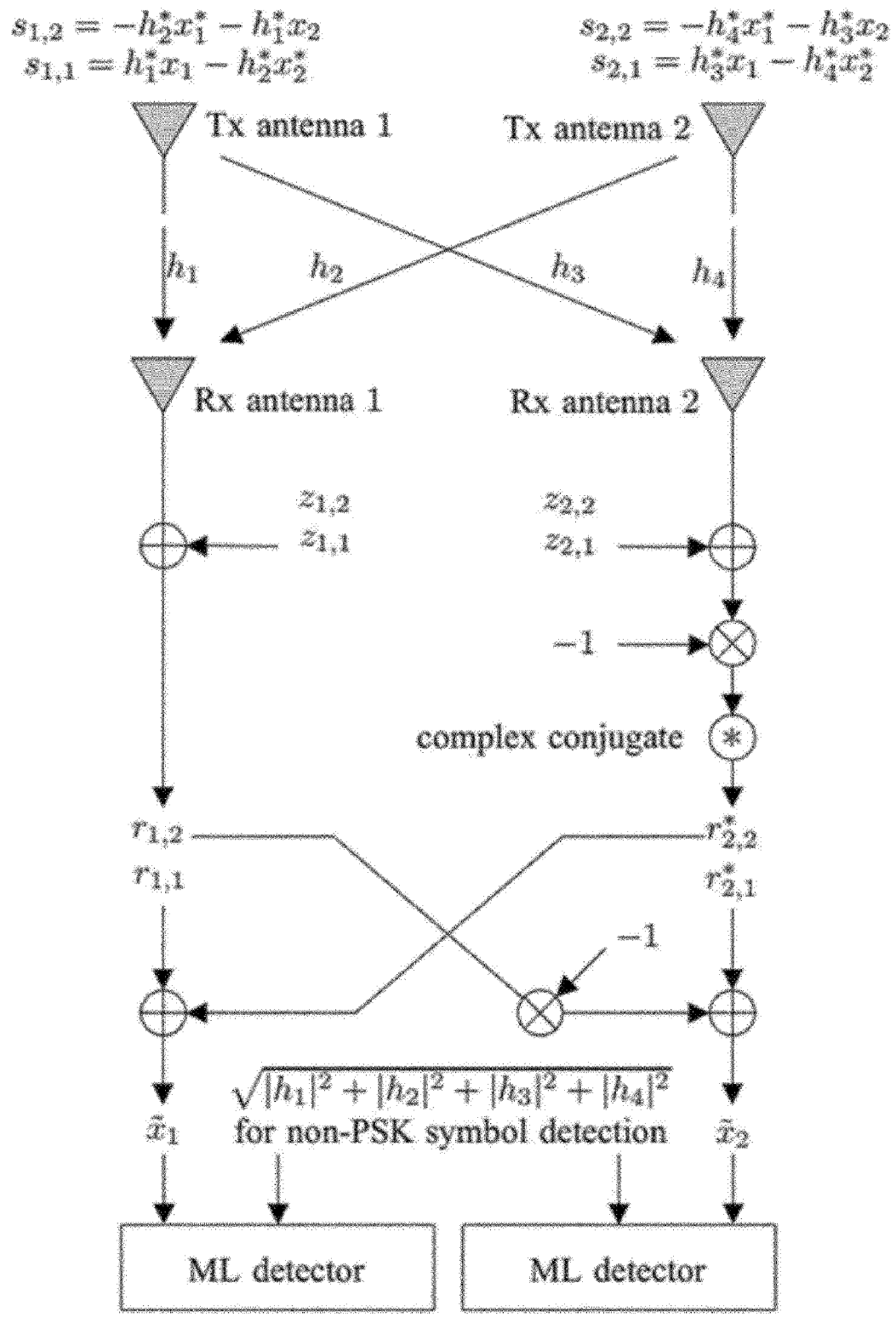
FIG. 4 is a view illustrating a space-time line coding method according to another embodiment of the present invention.

FIG. 4 is a view illustrating a space-time line coding method according to another embodiment of the present invention.

Channels from an m-th transmission antenna to a first reception antenna and a second reception antenna are defined as $h_{2m-1}$ and $h_{2m}$, respectively. Here, m is a value from 1 to M/2. By doing this, the STLC encoding for M/2 transmission antennas is as represented in the following Equation 18.

$$[s^*_{1,1} \ s_{1,2} \ \ldots \ s^*_{m,1} \ s_{m,2} \ \ldots \ s^*_{M/2,1} \ s_{M/2,2}]^T = C_{(1:M)} \begin{bmatrix} x^*_1 \\ x_2 \end{bmatrix}, \quad \text{[Equation 18]}$$

Here, $s_{m,t}$ is a symbol which is transmitted by the m-th transmission antenna at a time t and the STLC encoding matrix $C_{(1:M)} \in \mathbb{C}^{M \times 2}$ is configured as represented in the following Equation 19a.

$$C_{(1:M)} = [C_{(1,2)}^T \ \ldots \ C_{(2m-1,2m)}^T \ \ldots \ C_{(M/2-1,M/2)}^T]^T \quad \text{[Equation 19a]}$$

Here, $C_{(2m-1, 2m)}$ is an STLC encoding matrix configured by $h_{2m-1}$ and $h_{2m}$. In Equation 19a, generally, $C_{(2m-1, 2m)}$ may follow the STLC structure of FIG. 3. Therefore, $C_{(1:M)}$ may satisfy the orthogonality as represented in the following Equation 19b.

$$C^H_{(1:M)} C_{(1:M)} = \sum_{m=1}^{M/2} C^H_{(2m-1,2m)} C_{(2m-1,2m)} = \gamma_M \begin{bmatrix} 1 & 0 \\ 0 & 1 \end{bmatrix} \quad \text{[Equation 19b]}$$

The decoding structure depends on the STLC encoding structure illustrated in FIG. 3, similarly to a single reception antenna system. Details will be described with an example of a 2×2 STLC system as illustrated in FIG. 4. A notation of a channel gain for the 2×2 STLC is as represented in Table 5.

TABLE 5

|  | Tx antenna 1 | Tx antenna 2 |
|---|---|---|
| Rx antenna 1 | $h_1$ | $h_2$ |
| Rx antenna 2 | $h_3$ | $h_4$ |

Channels $h_3$ and $h_4$ represent independent channel gains from a second transmission antenna to the first reception antenna and the second reception antenna, respectively.

5) Encoding and Transmitting Order

With regard to the STLC having two transmission antennas, the STLC encoding matrix $C^a_{(1,2)}$ and a type-2 structure of FIG. 3 are applied to the transmission antennas, that is, $C_{(2m-1,2m)} = C^a_{(2m-1,2m)}$ for all $m \in \{1,2\}$.

Decoding functions $f^*(\bullet,\bullet)$ and $f(\bullet,\bullet)$ are used for $\tilde{x}_1$ and $\tilde{x}_2$, respectively. By doing this, the encoding using $x_1$ and $x_2$ is proceeded as represented by the following Equation 20.

$$\begin{bmatrix} s^*_{1,1} \\ s_{1,2} \\ s^*_{2,1} \\ s_{2,2} \end{bmatrix} = \begin{bmatrix} c^a_{(1,2)} \\ c^a_{(3,4)} \end{bmatrix} \begin{bmatrix} x^*_1 \\ x_2 \end{bmatrix} = \begin{bmatrix} h_1 & h_2 \\ h^*_2 & -h^*_1 \\ h_3 & h_4 \\ h^*_4 & -h^*_3 \end{bmatrix} \begin{bmatrix} x^*_1 \\ x_2 \end{bmatrix}. \quad \text{[Equation 20]}$$

The resulting STLC symbols are as represented in the following Table 6.

TABLE 6

|  | Tx time t = 1 | Tx time t = 2 |
|---|---|---|
| Tx antenna 1 | $s_{1,1} = h_1 x_1 + h_2 x$ | $s_{1,2} = h_2 x_1 - h_1 x_2$ |
| Tx antenna 2 | $s_{2,1} = h_3 x_1 + h_4 x$ | $s_{2,2} = h_4 x_1 - h_3 x_2$ |

In order to satisfy the transmission power constraint condition $E_S$, the transmitting end normalizes $s_{1,t}$ and $s_{2,t}$ by $\eta$. The normalization factor $\eta$ may be easily derived to be $\eta = 1/\sqrt{\gamma_4}$ as to satisfy $E|\eta s_{1,t}|^2 + E|\eta s_{2,t}|^2 = E_S$ for all ts.

By doing this, the transmitting end simultaneously transmits $\eta s_{1,t}$ and $\eta s_{2,t}$ through the first transmission antenna and the second transmission antenna at the time t. Simultaneously, the reception symbol defined in FIG. 3 may be represented by the following Equation 21.

$$\begin{bmatrix} r_{1,1} & r_{1,2} \\ r_{2,1} & r_{2,2} \end{bmatrix} = \begin{bmatrix} h_1 & h_3 \\ h_2 & h_4 \end{bmatrix} \frac{1}{\sqrt{\gamma_4}} \begin{bmatrix} s_{1,1} \ s_{1,2} \\ \overline{STLC1} \\ s_{2,1} \ s_{2,2} \\ \overline{STLC2} \end{bmatrix} + \begin{bmatrix} z_{1,1} & z_{1,2} \\ z_{2,1} & z_{2,2} \end{bmatrix}. \quad \text{[Equation 21]}$$

6) Decoding Method

As seen from the STLC encoding matrix $C^a_{(1,2)}$ and the type-2 structure of FIG. 3, the STLC decoding structure is determined by the encoding structure so that the decoding method may be easily determined as represented in the following Equation 21.

$$f^*(r^*_{1,1}, r_{2,2}) = r_{1,1} + r^*_{2,2} = \sqrt{\gamma_4} x_1 + z_{1,1} + z^*_{2,2},$$

$$f^*(r^*_{2,1}, -r_{1,2}) = r^*_{2,1} - r_{1,2} = \sqrt{\gamma_4} x_2 + z^*_{2,1} - z_{1,2}. \quad \text{[Equation 22]}$$

A combiner is illustrated in FIG. 4. Here, it is necessary to note that the receiving end does not need full channel state information (CSI) to combine the received signal again. However, in a subsequent receiving step, in order to detect ML of a non-PSK symbol, an effective channel gain $\sqrt{\gamma_4}$ is necessary.

7) Reception SNR of STLC

A result signal to noise ratio after blind combination is easily derived from Equation 22 as represented in the following Equation 23.

$$SNR_{STLC}(\gamma_4) = \frac{\gamma_4 E_S}{2 N_o}. \quad \text{[Equation 23]}$$

From Equation 23, it is seen that the STLC having four channels surely achieve 2 which is an array process gain with four diversity orders as a full diversity gain. Further, the reception signal to noise ratio of a system having M/2 transmission antennas and two reception antennas may be derived from the decoding method of Equations 21 and 22, which is as represented in the following Equation 24.

$$SNR_{STLC}(\gamma_M) = \frac{\gamma_M E_S}{2 N_o}. \quad \text{[Equation 24]}$$

From Equation 24, it is confirmed that M/2×2 STLC system may acquire the diversity order M and the array gain M/2 same as the diversity order and the array processing gain of 2×/2 STBC.

Figure 5:
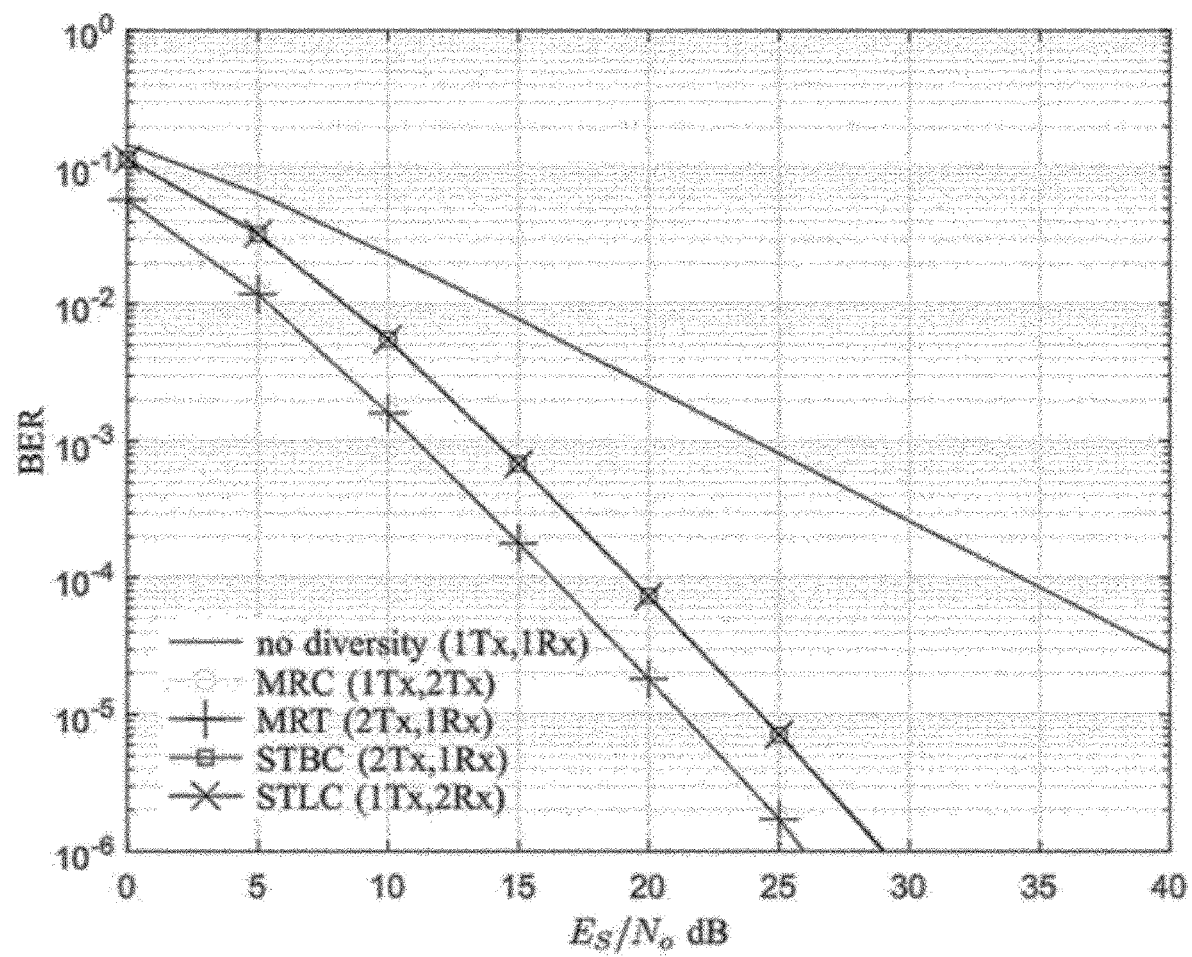
FIGS. 5 and 6 are views for comparing a performance of a space-time line coding method according to an embodiment of the present invention.
Figure 6:
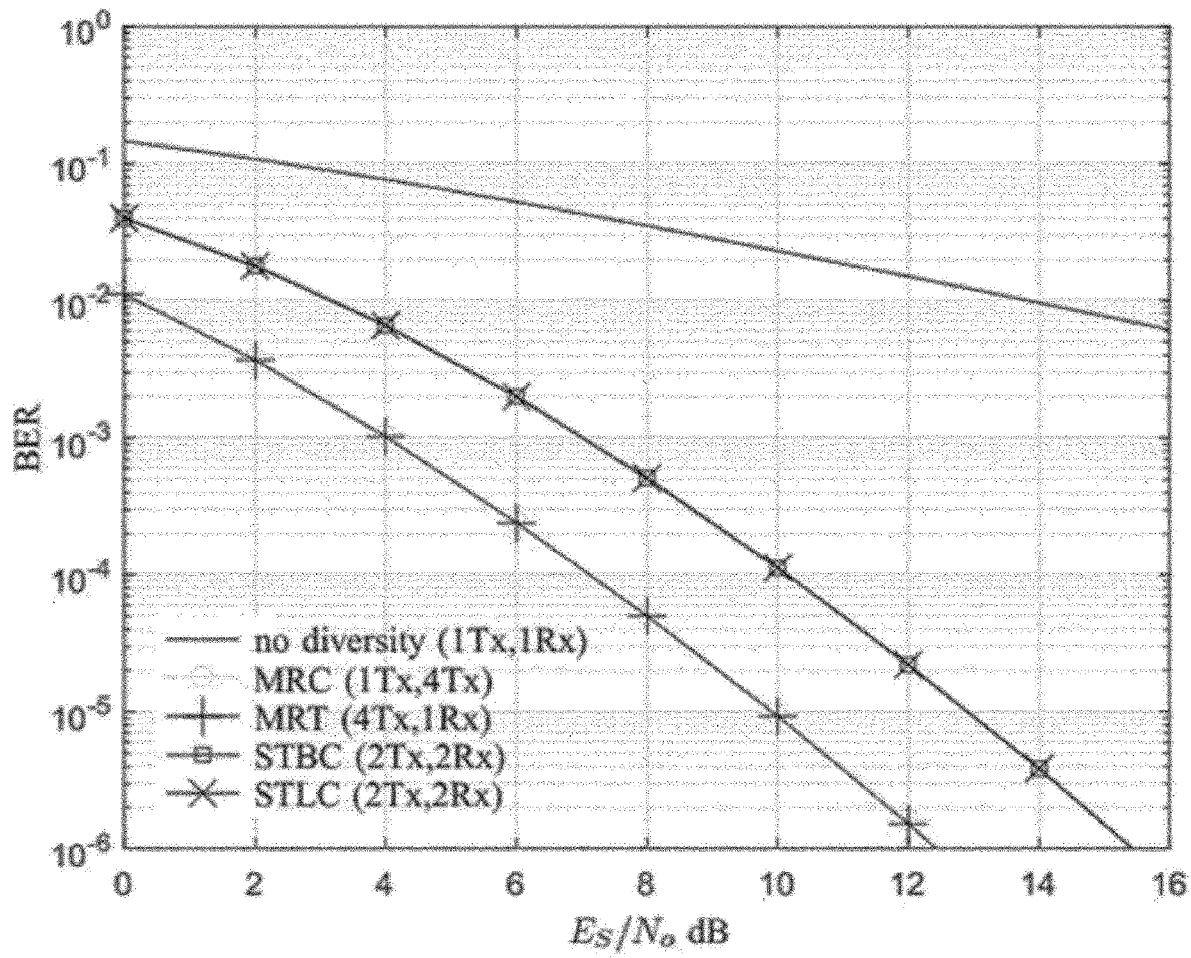

FIGS. 5 to 6 are views for comparing a performance of a space-time line coding method according to an embodiment of the present invention.

Until now, four methods of MRC, MRT, STBC, and STLC have been described. A performance of an example which has a full diversity at a rate-1 will be compared through a Monte Carlo simulation result of BER. For the sake of comparison, a no-diversity method of a system configured by a single transmission antenna and a single reception antenna is included for comparison. A channel is a Rayleigh fading, that is, $h_m \sim CN(0,1)$. In the simulation, a non-coded coherent binary PSK (BPSK) is considered.

In FIG. 5, two spatial channels, that is, a case of M=2 is illustrated. In each channel, a black solid line indicates a case without having diversity, a line with a pink circle indicates a 1×2 MRC, a line with blue I indicates a 2×1 MRT, a line with a red square indicates a 2×1 STBC, and a line with black X indicates a 1×2 STLC.

In FIG. 6, four spatial channels, that is, a case of M=4 is illustrated. In each channel, a black solid line indicates a case without having diversity, a line with a pink circle indicates a 1×4 MRC, a line with blue I indicates a 4×1 MRT, a line with a red square indicates a 2×2 STBC, and a line with black X indicates a 2×2 STLC.

As seen from FIGS. 5 and 6, it is confirmed that the STLC method proposed by the present invention has the same performance as the STBC method having the same diversity. Further, it is apparently shown that all space-time coding methods have a full diversity gain.

Further, it can be seen that in the STBC method and the STLC method, the signal to noise ratio (SNR) is lowered by 3 dB, as compared with the MRC method and the MRT method. The reason for 3 dB penalty in the STBC method is due to a half-power transmission in each antenna and the noise in the STLC method is caused by direct coupling of a reception signal which directly combines the noise.

The space-time line coding method proposed by the present invention, specifically, a method named as STLC has been described above. Further, the performance is compared with that of the space-time coding method of the related art. By doing this, it is confirmed that the space-time line coding method proposed by the present invention has the same performance as the STBC method of the related art. Next, even when the channel state information (CSI) is uncertain, it will be described that the robustness is maintained.

Figure 7:
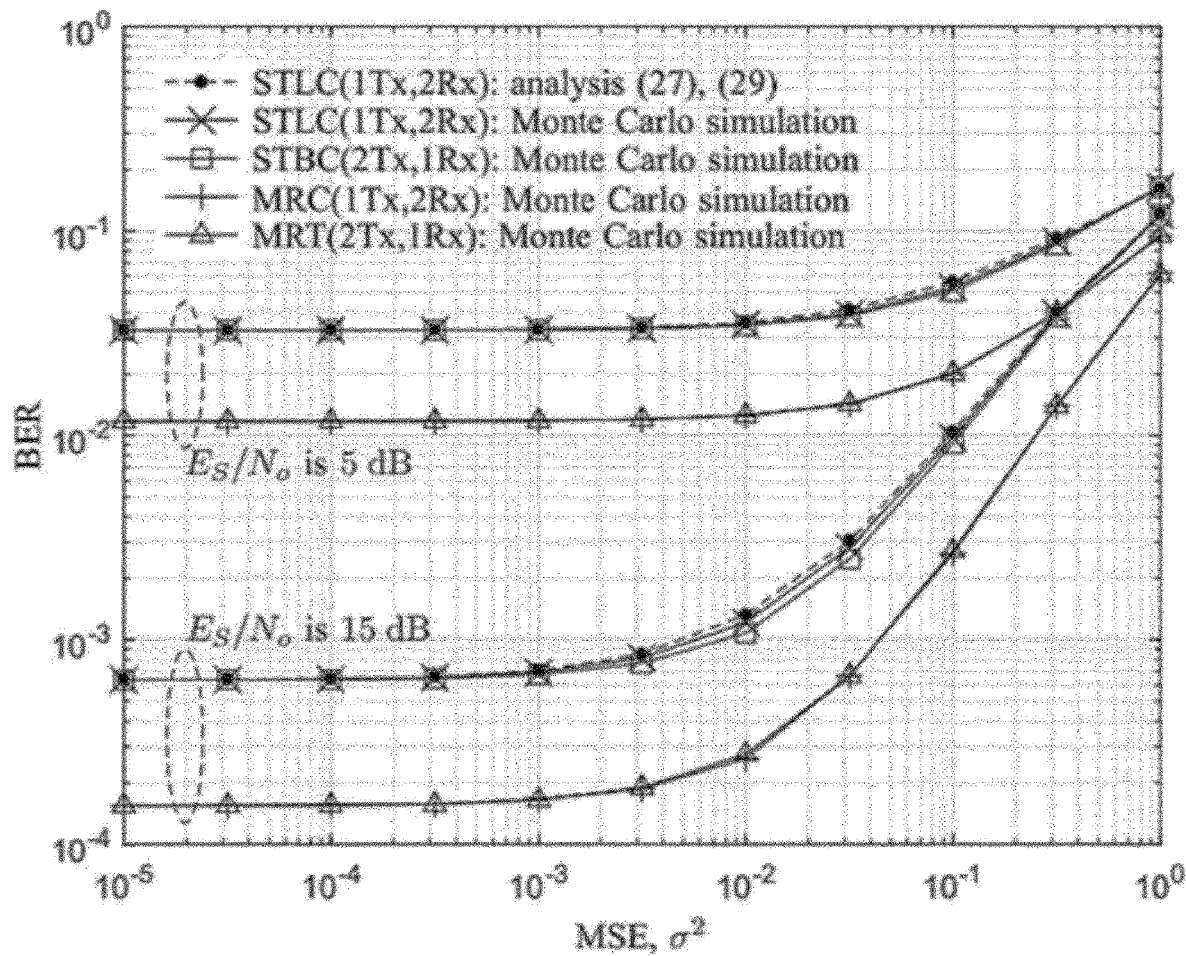
FIGS. 7 and 8 are views for comparing a performance in uncertain channel state information of a space-time line coding method according to an embodiment of the present invention.
Figure 8:
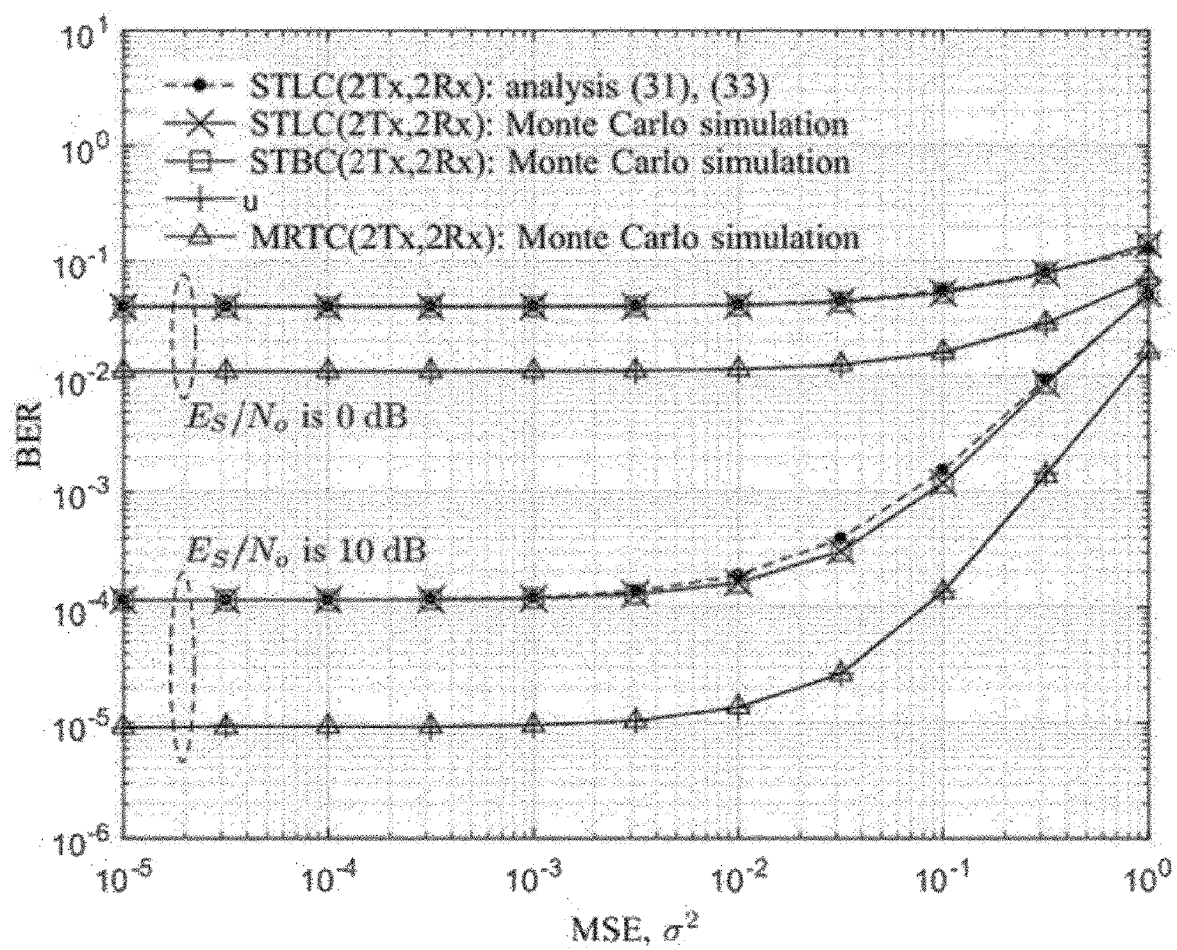

FIGS. 7 and 8 are views for comparing a performance in uncertain channel state information of a space-time line coding method according to an embodiment of the present invention.

Since the channel state information is acquired through channel estimation in a previous reception mode like a time variant channel of a TDD system, the CSI in a transmitting end of the STLC may actually include some incorrect information which is late for updates. Further, in consideration of an error of channel estimation and channel inconsistency in the TDD system, the uncertainty is inevitable due to the estimation error of the channel state information.

The estimated channel state information is represented by $\tilde{h} \triangleq h+\epsilon$. Here, h is actual channel state information and E is an estimation error. When it is assumed that estimation errors of all channels are independent from each other and follow a normal distribution having a zero mean and a variance $\sigma^2$, a mean-squared error (MSE) of the estimation is represented by $\sigma^2$.

That is, it is represented by $E|h-\tilde{h}|^2=\sigma^2$. Under the assumption that the channel state information is uncertain, the signal to noise ratios of the STLC method and the STBC method will be compared. As a result, it can be confirmed through numerical analysis that the STBC method and the STLC method have the same performance even though the channel state information is uncertain.

A case that the space diversity gain M is 2 will be described. First, uncertain channel state information is modeled as $\tilde{h}_m = h_m + \epsilon_m$ and $\epsilon_m \sim CN(0, \sigma^2)$. When the modeled channel state information is applied to the STLC symbol encoding process of Equation 13, Equation 15 may be rewritten by the following Equation 25.

$$r_{1,1} = \frac{1}{\sqrt{\tilde{\gamma}_2}} h_1(\tilde{h}_1^* x_1 + \tilde{h}_2^* x_2^*) + z_{1,1},$$ [Equation 25]

$$r_{1,2} = \frac{1}{\sqrt{\tilde{\gamma}_2}} h_1(\tilde{h}_2^* x_1^* - \tilde{h}_1^* x_2) + z_{1,2},$$

$$r_{2,1} = \frac{1}{\sqrt{\tilde{\gamma}_2}} h_2(\tilde{h}_1^* x_1 + \tilde{h}_2^* | x_2^*) + z_{2,1},$$

$$r_{2,2} = \frac{1}{\sqrt{\tilde{\gamma}_2}} h_2(\tilde{h}_2^* x_1^* - \tilde{h}_1^* x_2) + z_{2,2},$$

Here, $\tilde{\gamma}_2 = |\tilde{h}_1|^2 + |\tilde{h}_2|^2$. When STLC of Equation 25 is decoded using Equation 16, the following Equation 26 may be obtained.

$$r_{1,1} + r_{2,2}^* = \frac{\gamma_2}{\sqrt{\tilde{\gamma}_2}} x_1 + \frac{(h_1 \epsilon_1^* - h_2^* \epsilon_2) x_1}{\sqrt{\tilde{\gamma}_2}} +$$ [Equation 26]

$$\frac{(h_1 \epsilon_2^* - h_2^* \epsilon_1) x_2^*}{\sqrt{\tilde{\gamma}_2}} + z_{1,1} - z_{2,2}^*,$$

$$r_{2,1}^* - r_{1,2}^* = \frac{\gamma_2}{\sqrt{\tilde{\gamma}_2}} x_2 + \frac{(h_1 \epsilon_1^* + h_2^* \epsilon_2) x_2}{\sqrt{\tilde{\gamma}_2}} +$$

$$\frac{(h_2^* \epsilon_1 - h_1 \epsilon_2^*) x_1^*}{\sqrt{\tilde{\gamma}_2}} + z_{2,1}^* - z_{1,2}.$$

It is assumed that the receiving end knows an effective channel gain $\gamma_2/\sqrt{\tilde{\gamma}_2}$, rather than full channel state information (full CSI) for equalization. It is assumed that second and third interference terms on a right side of Equation 26 is AWGN. By doing this, the signal to noise ratio SNR of the 1×2 STLC method when the channel state information is uncertain may be derived from Equation 26 as represented in the following Equation 27.

$$SNR_{STLC}(\gamma_2, \sigma^2) = \frac{\gamma_2^2 E_S}{2(\gamma_2 E_S \sigma^2 + (\gamma_2 + 2\sigma^2) N_o)},$$ [Equation 27]

Here, it is assumed that the estimation error $\epsilon_m$, a data symbol $x_m$, and a noise $z_m$ are independent from each other. By doing this, as expected, when there is no channel uncertainty, that is, $\sigma^2=0$, Equation 27 is changed to Equation 17.

Similarly, when the channel state information is uncertain, a decoded symbol of the STBC in Equation 10 is written as $\tilde{H}_{(1,2)}{}^H(H_{(1,2)}x+z)$ and estimation values of $x_1$ and $x_2$ of STBC may be derived therefrom as represented in the following Equation 28.

$$\tilde{x}_1 = x_1 + \frac{(h_1\epsilon_1^* + h_2^*\epsilon_2)x_1}{\gamma_2} + \frac{(h_2\epsilon_1^* - h_1^*\epsilon_2)x_2}{\gamma_2} + \frac{\sqrt{2}((h_1^* + \epsilon_1^*)z_{1,1} + (h_2 + \epsilon_2)z_{1,2}^*)}{\gamma_2},$$

$$\tilde{x}_2 = x_2 + \frac{(h_1^*\epsilon_1 + h_2\epsilon_2^*)x_2}{\gamma_2} + \frac{(h_1\epsilon_2^* - h_2^*\epsilon_1)x_1}{\gamma_2} + \frac{\sqrt{2}((h_2^* + \epsilon_2^*)z_{1,1} - (h_1 + \epsilon_1)z_{1,2}^*)}{\gamma_2},$$

[Equation 28]

Here, it is assumed that the effective channel gain $\gamma_2$ is known to the STBC receiving end. By doing this, the signal to noise ratio of the 2×1 STBC system may be derived from Equation 28, which is the same as the signal to noise ratio of the 1×2 STLC system. That is, it is represented by Equation 29.

$$SNR_{STBC}(\gamma_2, \sigma^2) = SNR_{STLC}(\gamma_2, \sigma^2). \quad \text{[Equation 29]}$$

The analysis of Equation 29 shows that the signal to noise ratios of the STBC method and the STLC method having two channels are the same even in the uncertain channel state information environment. A numerical comparison result thereof is confirmed from FIG. 7.

An analytic BER performance for the BPSK may be represented as BER=$Q(\sqrt{2SNR})^-$ through FIGS. 7 and 8. Here, the SNR is an analytic signal to noise ratio in Equations 27 and 29 and Q(•) is a Q-function like $$Q(x) = \frac{1}{\sqrt{2\pi}} \int_x^{\infty} \exp\left(\frac{-u^2}{2}\right) du.$$

The analysis results of Equations 27 and 29 satisfactorily coincide with the numerical result of FIGS. 7 and 8. The STLC method and the STBC method are robust against the channel state information uncertainty up to $\sigma^2=10^{-3}$.

In FIGS. 7 and 8, the BER performance of the MRT method and the MRC method to which the same channel state information uncertainty model is applied is also illustrated for the purpose of comparison. Similarly to the STBC method and the STLC method which provide the same performance regardless of the channel uncertainty, the MRC method and the MRT method also show the similar performance for the channel state information uncertainty. Of course, even in the MRC method and the MRT method, as in the STBC method and the STLC method, it is assumed that the receiving end knows the effective channel gain, that is, $\gamma_2$ and $\gamma_2$.

The case that the channel state information is uncertain when the space diversity M is 2 has been described by means of Equations 18 to 22. The same will be described for the case that the space diversity M is 4.

$x_1$ and $x_2$ of the 2×2 STLC method are estimated by the following Equation 30.

$$\tilde{x}_1 = x_1 + \frac{(h_1\epsilon_1^* + h_2^*\epsilon_2 + h_3\epsilon_4^* - h_4^*\epsilon_3)x_1}{\gamma_4} +$$

[Equation 30]

-continued $$\frac{(h_1\epsilon_2^* - h_2^*\epsilon_1 + h_3\epsilon_3^* + h_4^*\epsilon_4)x_2}{\gamma_4} + \frac{\sqrt{\gamma_4}(z_{2,1} + z_{2,2}^*)}{\gamma_4},$$

$$\tilde{x}_2 = x_2 + \frac{(h_1\epsilon_1^* + h_2^*\epsilon_2 + h_3\epsilon_3^* + h_4^*\epsilon_4)x_2}{\gamma_4} +$$

$$\frac{(-h_1\epsilon_2^* + h_2^*\epsilon_1 - h_3\epsilon_4^* + h_4^*\epsilon_3)x_1^*}{\gamma_4} + \frac{\sqrt{\gamma_4}(z_{2,1} - z_{1,2}^*)}{\gamma_4}.$$

When the signal to noise ratio of the 2×2 STLC method is derived from Equation 30 as represented in the following Equation 31.

$$SNR_{STLC}(\gamma_4, \sigma^2) = \frac{\gamma_4^2 E_S}{2(\gamma_4 E_S \sigma^2 + (\gamma_4 + 4\sigma^2)N_o)}. \quad \text{[Equation 31]}$$

Similarly, when $\sigma^2=0$, Equation 31 is changed to Equation 23.

Similarly, $x_1$ and $x_2$ of the 2×2 STBC method are estimated as represented in the following Equation 32.

$$\tilde{x}_1 = x_1 + \frac{1}{\gamma_4}(h_1\epsilon_1^* + h_2^*\epsilon_2 + h_3\epsilon_3^* + h_4^*\epsilon_4)x_1 +$$

$$\frac{1}{\gamma_4}(-h_1^*\epsilon_2 + h_2\epsilon_1^* - h_3^*\epsilon_4 + h_4\epsilon_3^*)x_2 +$$

$$\frac{\sqrt{2}(h_1^* + \epsilon_1^*)z_{1,1}}{\gamma_4} + \frac{\sqrt{2}(h_2 + \epsilon_2)z_{1,2}^*}{\gamma_4} +$$

$$\frac{\sqrt{2}(h_3^* + \epsilon_3^*)z_{2,1}}{\gamma_4} + \frac{\sqrt{2}(h_4 + \epsilon_4)z_{2,2}^*}{\gamma_4},$$

$$\tilde{x}_2 = x_2 + \frac{1}{\gamma_4}(h_1^*\epsilon_1 + h_2\epsilon_2^* + h_3^*\epsilon_3 + h_4\epsilon_4^*)x_2 +$$

$$\frac{1}{\gamma_4}(h_1\epsilon_2^* - h_2^*\epsilon_1 + h_3\epsilon_4^* - h_4^*\epsilon_3)x_1 + \frac{\sqrt{2}(h_2^* + \epsilon_2^*)z_{1,1}}{\gamma_4} -$$

$$\frac{\sqrt{2}(h_1 + \epsilon_1)z_{1,2}^*}{\gamma_4} + \frac{\sqrt{2}(h_4^* + \epsilon_4^*)z_{2,1}}{\gamma_4} - \frac{\sqrt{2}(h_3 + \epsilon_3)z_{2,2}^*}{\gamma_4}.$$

[Equation 32]

The signal to noise SNR of the 2×2 STBC method is derived from Equation 32. This is summarized as represented in Equation 33.

$$SNR_{STBC}(\gamma_4, \sigma^2) = SNR_{STLC}(\gamma_4, \sigma^2). \quad \text{[Equation 33]}$$

In FIG. 8, in the case of the STBC method and the STLC method having four channels, that is, the space diversity gain M=4, the BER having the BPSK modulation is evaluated by the MSE of the channel estimation. In the case of M=4, when it is compared with 1×4 MRC and 4×1 MRT, the result is the same as the analysis of Equations 31 and 33.

As seen from Equation 33, the space-time line coding method proposed by the present invention, that is, the STLC method is robust against the channel state information uncertainty, which is the same as the STBC method. Further, as expected, the MRC method and the MRT method are performed to be similar to each other with regard to the channel state information uncertainty.

The space-time line coding method proposed by the present invention has been described above. The STLC method starts with a fundamental attempt to find an opposite part of space-time block coding (STBC) which is well known in the art. When a multiple-antenna transmitter does not have any channel state information (CSI), the STBC (space-time block code) method may provide a full diversity gain. In contrast, when a multiple-antenna receiver does not have any channel state information (CSI), the STLC method may provide a full diversity gain.

The space-time line coding method proposed by the present invention encodes two information symbols using a multi-channel gain (space) and continuously (time) transmits. Two encoding symbols are sequentially transmitted through one transmission antenna so that as compared with a block shape of the STBC method, the shape is line. Therefore, the new space-time line coding method is named as a space-time line code (STLC).

Further, the STLC method may be directly expanded to a system having multiple transmission antennas. In this case, it is understood that a plurality of independent STLCs is implemented as a parallel line. The full diversity may be achieved by a simple decoding method which directly combines reception signals by two reception antennas at two symbol times.

It should be noted that any channel state information is not necessary for the coding or reception signal combination. Further, the STLC is a space-time coding method which achieves the full diversity gain so that the STLC has a design characteristic which achieves a complex orthogonality and a full diversity gain of an encoding matrix.

The STLC has the same advantages as the STBC method, for example, improvement of an error performance, a data speed, a capacity, and a coverage region. Further, a new method of the STLC is applicable to a simple and inexpensive receiving end which is hard to have channel state information, so that the method may be applicable to various wireless communication systems. Further, the STLC method has a symmetrical structure to the existing STBC method so that the STLC method is applicable to uplink/downlink together with the STBC method.

Figure 9:
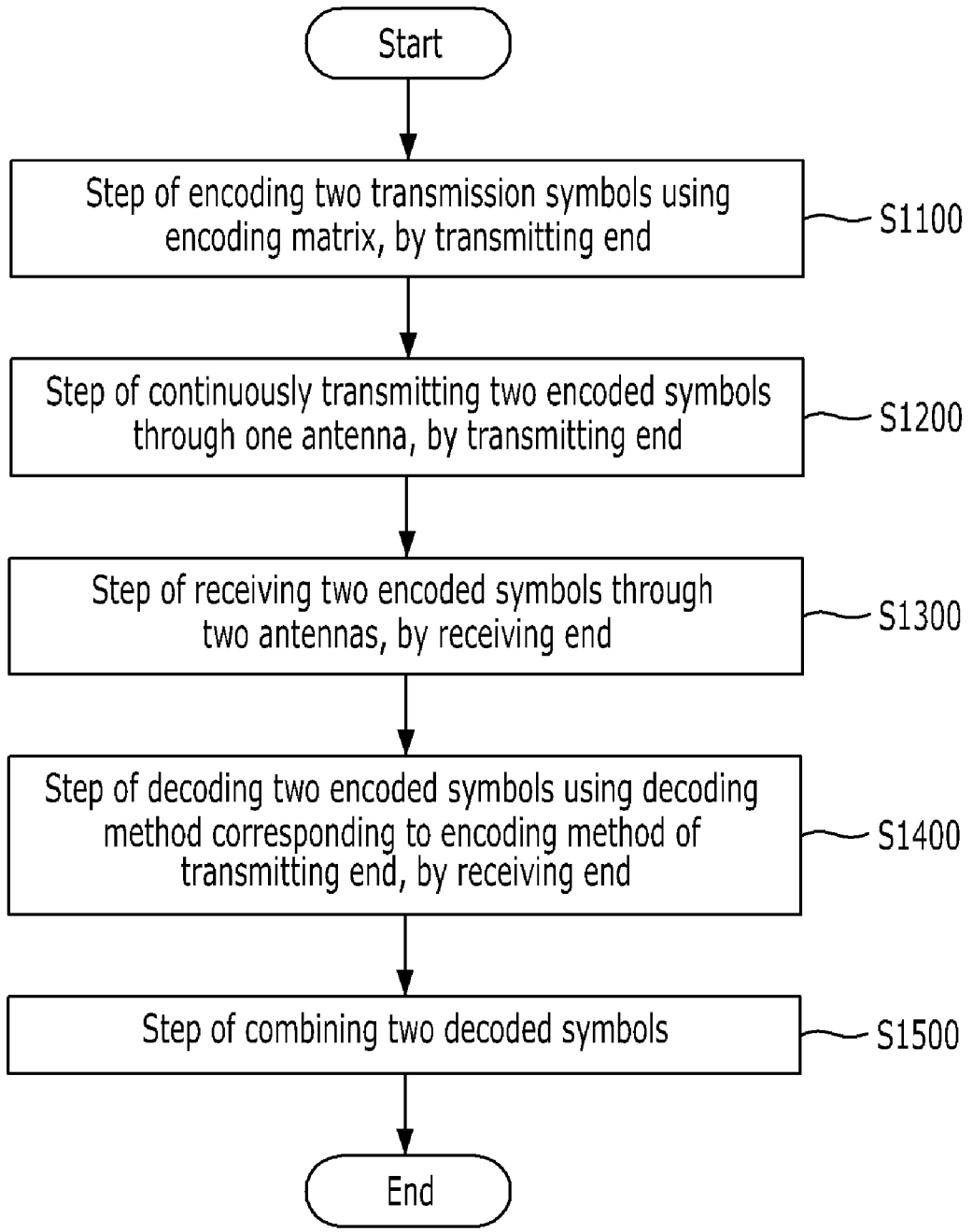
FIG. 9 is a flowchart of a space-time line coding method according to an embodiment of the present invention.

FIG. 9 is a flowchart of a space-time line coding method according to an embodiment of the present invention.

Referring to FIG. 9, a transmitting end encodes two transmission symbols using an encoding matrix (S1100). The encoding matrix used in this step may be one of $C_{(1,2)}$ illustrated in an upper portion of FIG. 3. In this case, during the encoding process, 16 combinations may be obtained in accordance with a conjugate operation of a symbol signal and a conjugate operation of an STLC symbol signal. This is classified by types illustrated in a lower portion of FIG. 3.

Next, the transmitting end continuously transmits two encoded symbols through one antenna (S1200). Two encoded symbols are continuously transmitted so that the space-time coding method proposed by the present invention is named as a space-time line coding method by emphasizing the meaning of line.

The receiving end receives the two encoded symbols through two antennas (S1300). Further, the receiving end decodes two encoded symbols using a decoding method corresponding to the encoding method of the transmitting end (S1400). The decoding function corresponding to the encoding matrix of the transmitting end is represented in an upper right side of FIG. 3.

Finally, the receiving end combines two decoded symbols (S1500). The same full diversity gain as the STBC method may be provided by the above-described steps. Further, even though channel information is lost, a data transmitting method robust against the environment may be applied.

The exemplary embodiments of the present disclosure have been described with reference to the accompanying drawings, but those skilled in the art will understand that the present disclosure may be implemented in another specific form without changing the technical spirit or an essential feature thereof. Thus, it is to be appreciated that embodiments described above are intended to be illustrative in every sense, and not restrictive.

The invention claimed is:

1. A space-time line coding method, in multiple antenna communication configured with at least one transmission antenna and at least two reception antennas, the method comprising:

encoding two information symbols using channel state information, by a transmitting end;

sequentially transmitting the two encoded information symbols using the at least one transmission antenna to a receiving end, by the transmitting end;

receiving the two encoded information symbols using two reception antennas of the at least two reception antennas, by the receiving end;

combining the received symbols without the channel state information, by the receiving end.

2. The space-time line coding method of claim 1, wherein when a number of transmission antennas is at least two and a number of reception antennas is two, the encoding of the two information symbols comprises encoding the information symbols by any one of following Equations 12a to 12d:

$$S = C_{(1,2)} * X \qquad \text{[Equation 12a]}$$

$$S = C_{(1,2)}^{*} * X \qquad \text{[Equation 12b]}$$

$$S = -C_{(1,2)} * X \qquad \text{[Equation 12c]}$$

$$S = -C_{(1,2)}^{*} * X, \qquad \text{[Equation 12d]}$$

in which S is a 2*1 vector having the encoded information symbols as elements, $C_{(1,2)}$ is a 2*2 encoding matrix having the channel state information as elements, and X is a 2*1 matrix having the information symbol as elements.

3. The space-time line coding method of claim 2, wherein when the number of transmission antennas is at least two and the number of reception antennas is two, the encoding matrix C(1,2) is any one of $$C_{(1,2)}^a = \begin{bmatrix} h_1 & h_2 \\ h_2^* & -h_1^* \end{bmatrix} \text{ or }$$

$$C_{(1,2)}^b = \begin{bmatrix} h_1 & h_2 \\ -h_2^* & h_1^* \end{bmatrix} \text{ or }$$

$$C_{(1,2)}^c = \begin{bmatrix} h_1 & -h_2 \\ h_2^* & h_1^* \end{bmatrix} \text{ or }$$

$$C_{(1,2)}^d = \begin{bmatrix} -h_1 & h_2 \\ h_2^* & h_1^* \end{bmatrix},$$

in which $h_1$ is a channel between a first transmission antenna and a first reception antenna, and $h_2$ is a channel between a second transmission antenna and a second reception antenna.

4. The space-time line coding method of claim 2, wherein the vector S having the encoded information symbols as elements is any one of $$\begin{bmatrix} s_1^* \\ s_2 \end{bmatrix} \text{ or } \begin{bmatrix} s_1 \\ s_2^* \end{bmatrix},$$

in which $s_1$ is an encoded information symbol to be transmitted at a first time, and s2 is an encoded information symbol to be transmitted at a second time which is subsequent to the first time.

5. The space-time line coding method of claim 2, wherein the matrix X having the information symbol as elements is any one of $$\begin{bmatrix} x_1 \\ x_2 \end{bmatrix} \text{ or } \begin{bmatrix} x_1^* \\ x_2 \end{bmatrix} \text{ or } \begin{bmatrix} x_1 \\ x_2^* \end{bmatrix} \text{ or } \begin{bmatrix} x_1^* \\ x_2^* \end{bmatrix},$$

and $x_1$ is a first information symbol and $x_2$ is a second information symbol.

6. The space-time line coding method of claim 3, wherein the combining of received signals includes:
when the encoding matrix $C_{(1,2)}$ is $$C_{(1,2)}^a = \begin{bmatrix} h_1 & h_2 \\ h_2^* & -h_1^* \end{bmatrix},$$

combining a first information symbol as $f(r^*_{1,1}, r_{2,2})$ and combining a second information symbol as $f(r^*_{2,1}, -r_{1,2})$, in which a function f is f(a,b)=a+b and $r_{m,t}$ is a signal received by an m-th reception antenna at a time t.

7. The space-time line coding method of claim 3, wherein the combining of received signals includes:
when the encoding matrix $C_{(1,2)}$ is $$C_{(1,2)}^b = \begin{bmatrix} h_1 & h_2 \\ -h_2^* & h_1^* \end{bmatrix},$$

combining a first information symbol as $f(r^*_{1,1}, -r_{2,2})$ and combining a second information symbol as $f(r^*_{2,1}, r_{1,2})$, in which a function f is f(a,b)=a+b and $r_{m,t}$ is a signal received by an m-th reception antenna at a time t.

8. The space-time line coding method of claim 3, wherein the combining of received signals includes:
when the encoding matrix $C_{(1,2)}$ is $$C_{(1,2)}^c = \begin{bmatrix} h_1 & -h_2 \\ h_2^* & h_1^* \end{bmatrix},$$

combining a first information symbol as $f(r^*_{1,1}, r_{2,2})$ and combining a second information symbol as $f(-r^*_{2,1}, r_{1,2})$, in which a function f is f(a,b)=a+b and $r_{m,t}$ is a signal received by an m-th reception antenna at a time t.

9. The space-time line coding method of claim 3, wherein the combining of received signals includes:
when the encoding matrix $C_{(1,2)}$ is $$C_{(1,2)}^d = \begin{bmatrix} -h_1 & h_2 \\ h_2^* & h_1^* \end{bmatrix},$$

combining a first information symbol as $f(-r^*_{1,1}, r_{2,2})$ and combining a second information symbol as $f(r^*_{2,1}, r_{1,2})$, in which a function f is f(a,b)=a+b and $r_{m,t}$ is a signal received by an m-th reception antenna at a time t.

10. The space-time line coding method of claim 1, further comprising:
performing the encoding and the transmitting for each of transmission antennas in parallel when at least two transmission antennas are provided.

11. A space-time line coding system, in multiple antenna communication configured with at least one transmission antenna and at least two reception antennas, comprising:
a transmitting end which encodes two information symbols using channel state information and sequentially transmits the two encoded information symbols to a receiving end using the at least one transmission antenna; and
a receiving end which receives the two encoded information symbols using the at least two reception antennas and combines the received symbols without the channel state information.

12. The space-time line coding method of claim 1, wherein the encoding of two information symbols is performed by using orthogonal encoding matrix C.

* * * * *